United States Patent [19]
Kästel

[11] Patent Number: 4,548,086
[45] Date of Patent: Oct. 22, 1985

[54] DEFLECTING SPRING
[75] Inventor: Walter Kästel, Steinen, Fed. Rep. of Germany
[73] Assignee: Endress U. Hauser GmbH u. Co., Maulburg, Fed. Rep. of Germany
[21] Appl. No.: 521,890
[22] Filed: Aug. 10, 1983
[30] Foreign Application Priority Data
Sep. 3, 1982 [DE] Fed. Rep. of Germany ....... 3232817
[51] Int. Cl.$^4$ ............................................... G01L 1/22
[52] U.S. Cl. .................................... 73/862.65; 73/726
[58] Field of Search ................... 73/862.65, 720, 721, 73/726, 727; 338/4, 5

[56] References Cited
FOREIGN PATENT DOCUMENTS

| 2242222 | 1/1974 | Fed. Rep. of Germany . |
| 2608381 | 8/1977 | Fed. Rep. of Germany . |
| 0124769 | 9/1979 | Japan ............................. 73/862.65 |
| 0124770 | 9/1979 | Japan ............................. 73/862.65 |
| 1534276 | 11/1978 | United Kingdom .................... 338/5 |

Primary Examiner—Charles A. Ruehl
Attorney, Agent, or Firm—Laubscher & Laubscher

[57] ABSTRACT

A deflecting spring for distance or force measurement, particularly suited for use in force or pressure gauges and made of an areal spring material is provided with a force introducing section (2), a clamping section (6), and an intermediate section (45) connected to the first two sections (2,6) by flexural webs (10-13) which are equipped with sensor elements serving to convert bending into electrical signals. The intermediate section comprises two part sections (4,5) disposed at either side of an axis of symmetry (S) of the deflecting spring and each connected by a first web (10,11) with the force introducing section and by a second web (12,13) with the clamping section (6). By virtue of this design of the deflecting spring the respective webs belonging to a part section each are deflected in opposite directions when the force introducing section (3) is bended so that also opposite output signals are generated by the sensor elements. When the latter are applied to one side of the deflecting spring they may be combined in such manner in a full bridge circuit that measuring errors are compensated.

8 Claims, 6 Drawing Figures

DEFLECTING SPRING

BACKGROUND OF THE INVENTION

The invention relates to a deflecting spring for distance or force measurement, particularly for use in force or pressure gauges, comprising a force introducing section and a clamping section, the two sections being interconnected by flexural webs which are furnished on one side with sensor elements to convert bending into electrical signals.

DESCRIPTION OF PRIOR ART

In a known deflecting or bending spring of this kind (DE-AS No. 26 08 381, FIG. 7) the flexural webs themselves serve as connecting members between the force introducing section and the clamping section. In operation these webs are deflected throughout their lengths so that the sensor elements disposed on the webs experience only relatively little elongation or compression. Consequently the output signal of the sensor elements is relatively weak, i.e. the measuring effect is small. With the known deflecting spring the clamping area merges directly into the flexural web areas. As the results of the bending strain are different in the clamping section and outside of the same, this may provide a false measuring result. Finally, the known deflecting spring is expensive to produce.

With another known deflecting or bending spring (DE-AS No. 22 42 222) a one-part intermediate section is connected to the force introducing and clamping sections, respectively, by a total of two webs disposed on an axis of symmetry. As the force introducing section is deflected in a direction transversely of the plane of the deflecting spring, the webs are bent in the same direction, i.e. the maximum deflections having the same sign.

Therefore, sensor elements provided at one side of the webs will generate measuring signals of the same sign when the deflecting spring is placed under load. However, it is desired to have measuring signals of opposite sign so as to be able to realize a compensation circuit, for instance a bridge circuit in which the sensor elements are so connected with opposite signs that measuring errors are compensated. If such a circuit is to be realized with the known deflecting spring, the sensor elements must be applied to opposite sides of the deflecting spring. Such an arrangement of the sensor elements has disadvantages with respect to the sensitivity and temperature coefficient. Above all, however, this provision of the sensor elements is not suitable for applying the sensor elements by thin film technique which would permit miniaturization at inexpensive mass production but require that the sensor elements be applied to one side only of the deflecting spring. Moreover, the known deflecting spring is susceptible of lateral tilting for having only two webs arranged on an axis of symmetry.

SUMMARY OF THE INVENTION

It is an object of the invention to design a deflecting spring of the kind specified initially such that the disadvantages mentioned are avoided and a high measuring effect is warranted without the risk of falsification of the measuring result.

It is also an object of the invention to provide a deflecting spring of the kind specified which is easy to produce.

Furthermore, it is an object of the invention to provide a deflecting spring adapted to have the sensor elements applied on one side of the deflecting spring in such manner that the sensor elements will be stressed oppositely so that they may be connected together in a compensation circuit permitting compensation of measuring errors.

To meet these objects, it is provided in accordance with the invention in a deflecting spring of the kind specified initially that at least two separate part sections are disposed at either side of an axis of symmetry of the deflecting spring, that each part section is connected by a first web with the force introducing section and by a second web with the clamping section, that the webs are equidirectional, and that the part sections each are disposed between a first web and a second web.

With the deflecting spring according to the invention the webs are very short. Therefore, flexing or bending in operation will cause very intensive compression or elongation respectively of the inner or outer cross sectional fiber, thus providing a strong output signal of the sensor elements. Furthermore, the webs may be positioned remote from the direct vicinity of the clamping section so that falsification of the measuring result by different bending behavior in the clamping range is excluded.

When the deflecting spring in operation is bent by the force introducing section, those webs which connect the force introducing section with the two part sections are bent in opposite direction to the bending direction of the webs which connect the part sections with the clamping section. Consequently sensor elements applied to the webs mentioned first will furnish measuring signals of opposite sign as compared to the sensor elements applied to the webs which serve for connection to the clamping section.

The deflecting spring thus is of such design that the sensor elements may be applied on one and the same side of the webs and connected electrically so as to present a full bridge circuit. This permits application of the sensor elements from the side in question by an adherence or thin film technique so that miniaturization in mass production is warranted. The deflecting spring itself may also be mass produced. Complicated cut-outs to form the part sections and the webs in the spring which preferably is round, may be made by etching, spark erosion or similar procedures since the configuration of the deflecting spring when under load permits it to be produced from an areal blank such as a round spring plate.

Preferably the webs belonging to each part section are arranged in mutual alignment. The webs may be so dimensioned and disposed that the force introducing section is shifted substantially parallel to the clamping section when a force is introduced.

A preferred form of the deflecting spring according to the invention is characterized in that the force introducing section comprises a central tongue and a transverse piece which is joined centrally to the tongue and from which the first webs are branched off symmetrically with respect to the tongue for connection with the part sections. The first webs and the part sections may be arranged in advantageous lateral and parallel relation with respect to the tongue. Further advantageous modifications are protected by the further sub-claims.

SHORT DESCRIPTION OF THE DRAWINGS

The invention will be described further, by way of example, with reference to the accompanying diagrammatic drawings, in which.

SPECIFIC DESCRIPTION OF PREFERRED EMBODIMENTS

Figure 1:
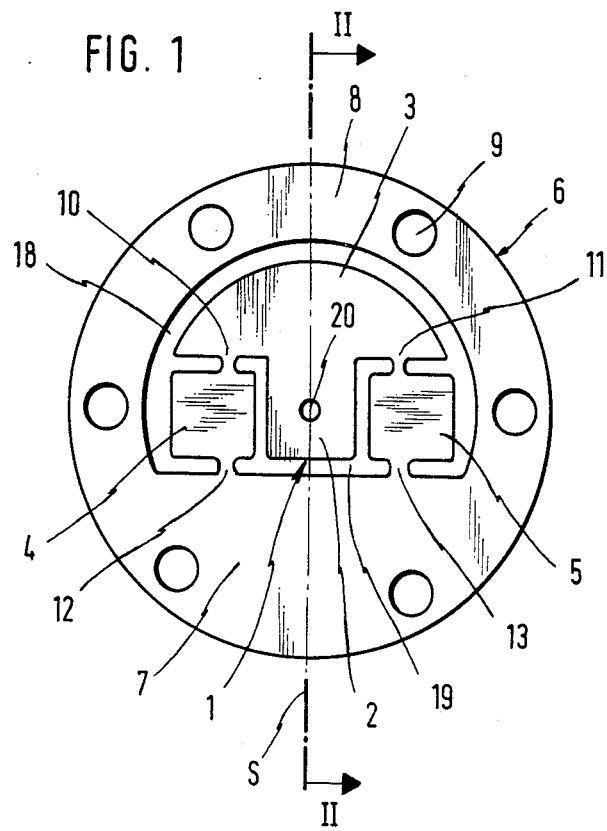
FIG. 1 is a top elevational view of a deflecting spring according to the invention.
Figure 2:
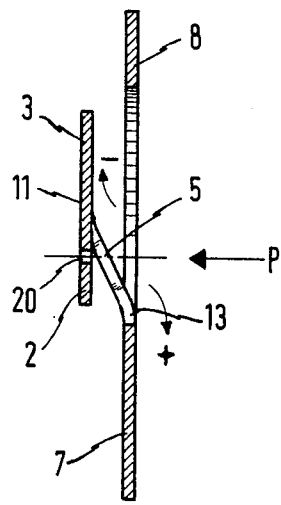
FIG. 2 is a sectional elevation along line II—II in FIG. 1 showing the deflecting spring in a deflected operational position.

The deflecting spring shown in FIGS. 1 and 2 is made of a planar disc of spring plate. It comprises a force introducing section 1 having a central tongue 2 and a transverse piece 3 joined to the same. The deflecting spring further comprises an intermediate section in the form of two part sections 4, 5 as well as clamping section 6. The part sections 4, 5 of the intermediate section are formed symmetrically with respect to the axis of symmetry S of the deflecting spring and arranged so as to be connected to the force introducing section 1 by webs 10, 11 extending at equal spacings from the axis of symmetry S and each in parallel with the same, and to be connected to a section 7 of circular segment shape of the clamping section 6 of the deflecting spring by webs 12, 13 arranged in similar fashion and in alignment with the same.

Figure 3:
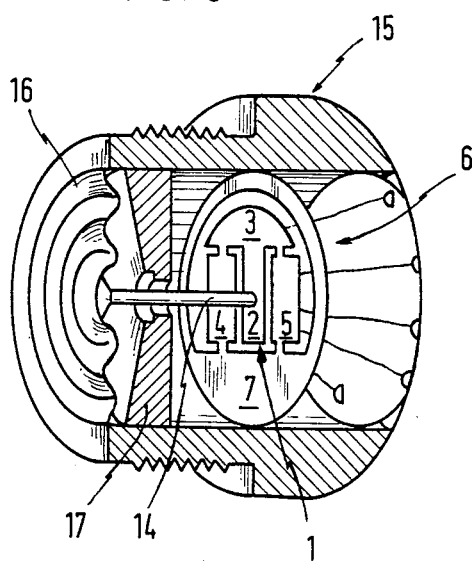
FIG. 3 is a perspective sectional elevation of a deflecting spring according to FIGS. 1 and 2 shown installed in a pressure gauge.

A ring of bores 9 for screws by which the clamping section is fixed in the interior of a housing 15 of a pressure gauge or the like are formed in the section 7 of circular segment shape and in a contiguous section 8 of circular ring shape (FIG. 3).

The force introducing section is adapted to be forcibly moved by a push rod 14 acting on the center of the deflecting spring by engaging the tongue 2 and being fixed in the bore 20 of the force introducing section 1.

When the deflecting spring is bent by the push rod 14 in the manner illustrated in FIG. 2, the webs 10, 11 are bent in one direction and the webs 12, 13 in opposite direction, each shown in FIG. 2 by the drawing of the bent shapes of the webs and the provision thereof with a minus or plus sign. Strain measuring strips glued on the webs from the same side are shown and designated in FIG. 4 as resistors, strain gauges R1 being applied on web 13, R2 on web 11, R3 on web 10, and R4 on web 12. In a Wheatstone bridge circuit according to FIG. 4 the four strain gauges are connected in opposite fashion with opposite signs so that measuring errors are compensated.

Figure 4:
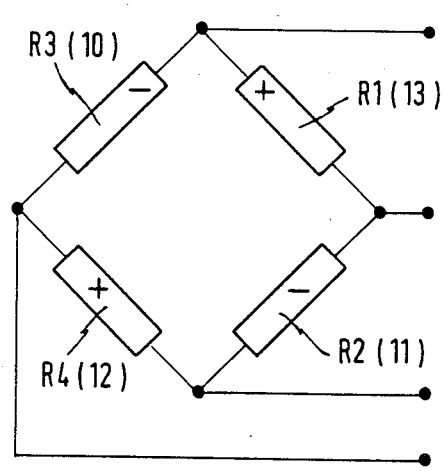
FIG. 4 is a full bridge circuit for the sensor elements applied on one side of the deflecting spring according to FIG. 1 and 3.

It is also possible to apply resistors in thin film technique on the webs 10 to 13 instead of the strain gauges, the connection otherwise being the same as shown in FIG. 4.

FIG. 3 shows the deflecting spring according to FIGS. 1 and 2 in built-in state in a pressure gauge having a housing 15, a diaphragm 16 adapted to be pressurized by fluid pressure and an abutment wall 17 for the diaphragm 16. The push rod 14 connected to the tongue 2 passes with clearance through the center of the abutment wall 17. Pressurization of the diaphragm causes the force introducing section 1 to be deflected by the push rod 14, as illustrated in FIG. 2. The full bridge circuit according to FIG. 4 supplies an output signal which is characteristic of the pressure acting on the diaphragm 16.

Figure 5:
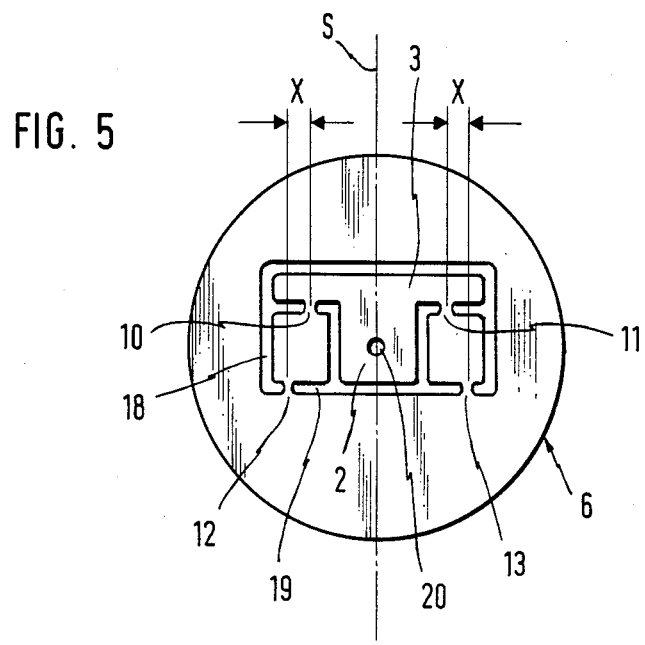
FIGS. 5 and 6 are top elevational views of two modified embodiments of the deflecting spring according to the invention.

The modification of the deflecting spring shown in FIG. 5 differs from the deflecting spring shown in FIG. 1 in that the webs 12, 13 are displaced by equal spacings x with respect to the webs 10, 11 so that they are not in alignment with the same along lines parallel to the axis of symmetry S.

Another structural difference as compared to the embodiment shown in FIG. 1 resides in the fact that the transverse piece 3 is formed by a straight bar rather than one of circular segment shape.

Figure 6:
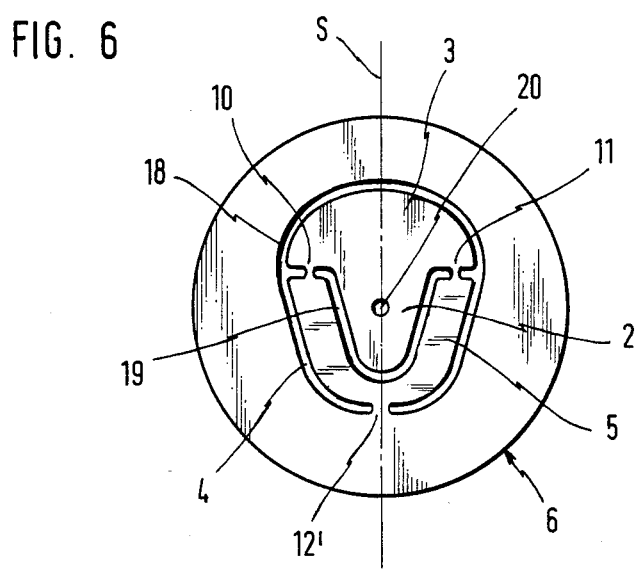

The embodiment of the deflecting spring according to FIG. 6 differs from the embodiments shown in FIGS. 1 and 5 in that the two part sections 4, 5 are connected to the clamping section 6 by a single web 12' instead of two webs 12, 13. In this case, too, two sensor elements may be applied side by side on the only web 12', both being located at the same side of the deflecting spring at which the sensor elements belonging to webs 10, 11 are applied, as with the previous embodiments. The circuitry of the sensor elements is the same as shown in FIG. 4. Instead of two, a single sensor element on web 12' may be sufficient, its output signal being duplicated so that once more a circuit as shown in FIG. 4 may be realized.

With all embodiments described, the deflecting spring is made from a planar spring disc, etching or working out by spark erosion the various sections described. Two continuous generally U-shaped oppositely-facing conentrically-arranged slots 18 and 19 are formed whose relatively complicated shape can be obtained easily by the manufacturing methods mentioned.

The deflecting behavior illustrated in FIG. 2 and explained with reference to this figure is common to all embodiments shown, namely opposite bending of webs 10, 11 and 12, 13 (12'), respectively. This permits a compensation circuit of the sensor elements applied on one side, as shown in FIG. 4.

What is claimed is:

1. A deflecting spring for distance or force measurement in a force or pressure gauge, comprising
   (a) a unitary spring plate containing a pair of oppositely-facing concentrically-arranged generally U-shaped slots (18,19) defining in said plate:
      (1) an outer clamping section (6);
      (2) an inner force-introducing section (1), said inner and outer sections having a given axis of symmetry (S);
      (3) a pair of intermediate sections (4,5) arranged on opposite sides of said force-introducing section, respectively, said intermediate sections being symmetrically arranged relative to said axis of symmetry;
      (4) a pair of first flexural webs (10,11) connecting said intermediate sections, respectively, at one end with said inner section;
      (5) a pair of second flexural webs (12,13) connecting said intermediate sections, respectively, at their other ends with said outer section, said webs being parallel, said first webs and said second webs being symmetrically arranged on opposite sides of said axis of symmetry, respectively; and (b) a plurality of flexure-responsive electrical sensors (R1–R4) mounted in parallel relation on corresponding faces of said webs, respectively, thereby to convert the bending forces of said spring into elecrtrical signals.

2. Apparatus as defined in claim 1, wherein said second webs are in alignment with said first webs, respectively.

3. A deflecting spring as defined in claim 1, characterized in that the webs (10 to 13) are so dimensioned that upon introductin of a force, said force introduction section (1) is shifted in a direction substantially parallel to said clamping section (6).

4. Apparatus as defined in claim 1, wherein said force-introducing section has a generally T-shaped configuration including central tongue (2) and transverse (3) portions, said first webs (10,11) being symmetrically arranged relative to said tongue portion for connection with said intermediate sections, respectively.

5. Apparatus as defined in claim 4, wherein said first webs and said intermediate sections are parallel with said tongue portion.

6. Apparatus as defined in claim 1, and further including means connecting said sensors to define a Wheatstone bridge circuit.

7. Apparatus as defined in claim 1, wherein said slots are formed in said plate by metal removal treatment.

8. A deflecting spring for distance or force measurement in a force or pressure gauge, comprising (a) a unitary spring plate containing a pair of oppositely-facing concentrically-arranged generally U-shaped slots (18,19) defining in said plate:
   (1) an outer clamping section (6);
   (2) an inner force-introducing section (1), said inner and outer sections having a given axis of symmetry (S);
   (3) at least one intermediate section having portions (4,5) arranged on opposite sides of said force-introducing section, respectively, said intermediate portions being symmetrically arranged relative to said axis of symmetry;
   (4) a pair of first flexural webs (10,11) connecting said intermediate portions, respectively, at one end with said inner section;
   (5) at least one second flexural web connecting said intermediate section with said outer section, said webs being parallel, said first webs being symmetrically arranged on opposite sides of said axis of symmetry, respectively; and (b) a plurality of flexure-responsive electrical sensors mounted in parallel relation on corresponding faces of said webs, respectively, thereby to convert the bending forces of said spring into electrical signals.

* * * * *